Feb. 9, 1960 J. T. BEESTON, JR 2,924,059
ROTARY LAWN MOWER BLADE
Filed May 31, 1957
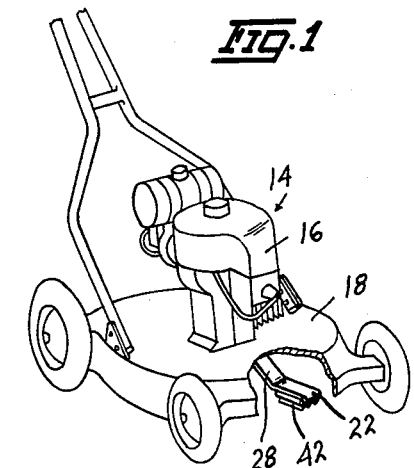
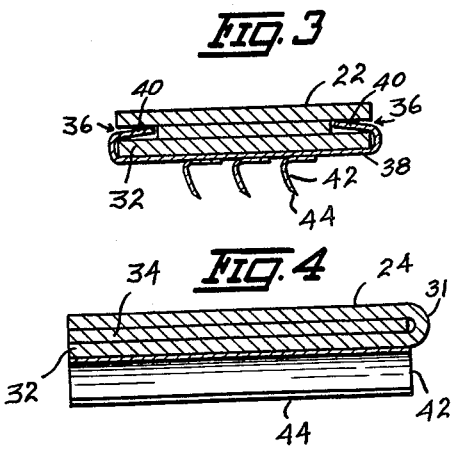
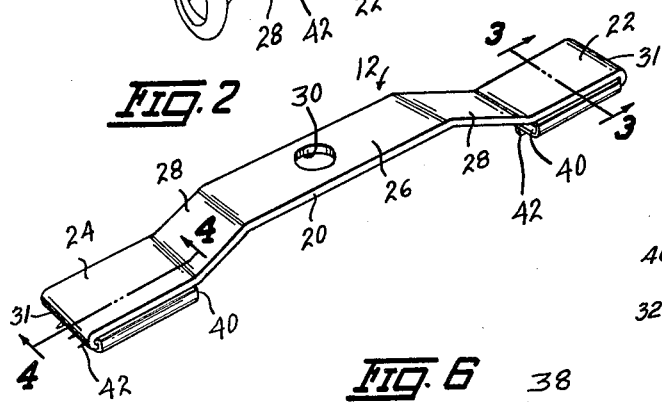
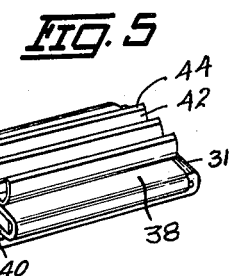
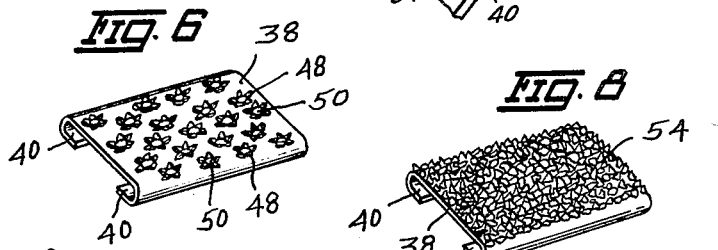
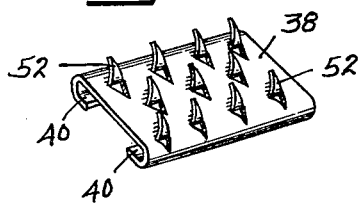
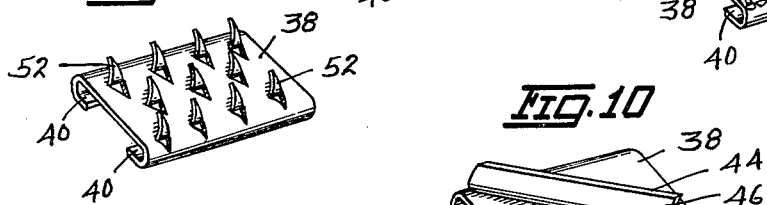
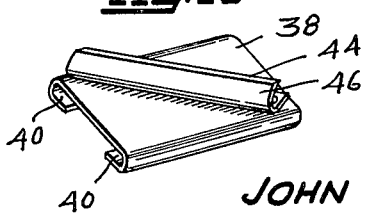
INVENTOR.
JOHN T. BEESTON, JR.
BY Morton L. Adler
ATTORNEY.

United States Patent Office 2,924,059
Patented Feb. 9, 1960

2,924,059

ROTARY LAWN MOWER BLADE

John T. Beeston, Jr., Des Moines, Iowa, assignor to Frontier Development Company, Des Moines, Iowa, a corporation of Iowa Application May 31, 1957, Serial No. 662,696

8 Claims. (Cl. 56—295)

My invention relates to power driven cutting blades and is more particularly designed for but not necessarily limited to, use with rotary type lawn mowers.

One of the important objects contemplated by this invention is the provision of a blade holder or bar having novel means for supporting a cutting blade that is easily releasable therefrom and attachable thereto.

Another object is to provide a cutting blade more particularly for a rotary type lawn mower that has novel cutting surfaces.

Still a further object herein is the provision of a blade of the above class having improved means for maintaining the same in place by centrifugal force during operation.

Other objects and advantages of this invention reside in the details of construction and correlation of the various parts and will be apparent as the description proceeds.

This invention consists of novel parts and combination of parts to be hereinafter described whereby the objects set forth are attained, as pointed out in the claims, and illustrated in the accompanying drawings in which:

Fig. 1 is a perspective view of a rotary type lawn mower with a portion cut away to show the location of my new blade, Fig. 2 is an enlarged perspective view of a blade holder showing my new cutting blade thereon, Fig. 3 is a cross sectional view taken on the line 3—3 of Fig. 2, Fig. 4 is a cross sectional view taken on the line 4—4 of Fig. 2, and, Figs. 5 to 10 inclusive are respective enlarged perspective views of my new cutting blade showing respective variations of representative cutting surfaces that may be formed thereon.

Referring to the drawings my new blade assembly is indicated generally by the numeral 12 in Fig. 2 and its operating position on a rotary type mower 14 is shown in Fig. 1. It will be understood that a vertically disposed shaft (not shown) extends from the motor 16 below the platform 18 in a well known manner and it is to such shaft that blade assembly 12 is attached.

It should be pointed out that while this new blade has been particularly designed for mowers with vertically disposed shafts, it can be applied without modification to certain types of rotating cutting devices where in the shaft is horizontally disposed.

The blade assembly 12 comprises an elongated rigid bar member 20 having respective like end sections 22 and 24 disposed on a lower plane than the center section 26 which is elevated by the bends or inclining surfaces 28. A hole 30 is formed in the center section 26 by which member 20 is attached to the motor shaft. Each of the end sections 22 and 24 is turned down and under forming a blade supporting clip defined by the closed U-shaped end or neck 31 and the portions 32 that are parallel to and spaced from the respective sections 22 and 24 as illustrated in Fig. 4. A filler plug 34 of the same length as portion 32 but narrower in width may be securely arranged between portions 32 and their respective main body sections so as to provide the channels or grooves 36 (Fig. 3) at each side which extend parallel to the longitudinal axis of bar holder 20 and which serves as a socket or blade holding member.

My new blade unit of which several variations in cutting edges are shown in Figs. 5 to 10, are all similarly formed for purposes of attachment to bar 20 and thus like parts in these several illustrations will be given like numerals. This blade unit includes a rectangular base 38 having opposite parallel side edges curved or bent in the same direction towards each other to form the respective C shaped tracks or clip members 40 running longitudinally at opposite sides of the base 28 and the cutting edges or members 42 extending from the base 38. Thus arranged, a blade unit is mounted to each end section 22 and 24 by sliding the tracks 40 onto portion 32 from its inner end as shown in Fig. 3. The width of channels 40 is such as to provide a suitable friction fit over the edges of portion 32 with the free ends of the clips disposed in channels 36 and completely enclosed and protected from external forces by members 22, 32, and 34, which combine to form the grooves 36 as illustrated in Fig. 3. The blade unit is positioned on portion 32 until it abuts the closed ends 31 of sections 22 and 24 and against which it bears under centrifugal force during rotation of blade holder 20. It will thus be appreciated that this blade unit cannot become dislodged while in operation and even though it may become tightly wedged in the socket provided by portions 32 it can be easily removed by a slight tapping if manual pressure alone is insufficient.

Cutting edges for my blade unit are in the form of projections depending from the base 38 and in Figs. 5, 6, 7, 8 and 10, for example, I have shown the blade unit inverted to more clearly illustrate the particular type of cutting edge. In Figs. 2, 3 and 5 the cutting edges are in the form of arcuate depending members 42 of which these may be one or more that extend parallel to the longitudinal axis of the base 38. Members 42 have the sharpened edges 44 and are curved toward their direction of rotation. Such cutting members 42 may be integrally formed on base 38 by a suitable mold, stamped out of the same, separately attached or otherwise provided in any suitable manner. The cutting member 46 is similar in form to member 42 but is disposed diagonally across base 38 to provide more of a slicing action.

In Fig. 6 the cutting members 48 comprise a plurality of groups of more or less jagged projections formed by punching holes 50 through base 38 in such a manner as not to cause a clean cut but similar to the result in driving a nail through a tin can, for example. In Fig. 7 the cutting members include a plurality of single prong or teeth like spaced projections 52 which are pressed out from base 38 or otherwise formed as shown. Fig. 8 illustrates the application of abrasive crystals 54 to base 38. In Fig. 9 a blade like cutting edge 56 is formed as a lateral projecting from one of the clips 40 and would be mounted at the leading edge of one of the sections 22 or 24 relative to the direction of rotation. This modification provides a cutting edge in the same relative position as presently used blade edges formed integral with the usual blade holding bar but is distinguished from such conventional blades by its novel means of attachment as above described.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. A blade assembly for use on a power driven cutting machine, comprising, a blade holder designed for operable connection to said machine for rotation about a central axis, an end portion of said holder having an integral member in parallel spaced relationship to form a blade supporting means, a blade consisting of a rigid body defining tracks on two opposite edges, said blade releasably frictionally mounted on said blade holder by engagement of each respective track with one side of said blade supporting means, said body lying in juxtaposition relative to said blade supporting means, and cutting elements depending from said body.

2. A device as defined in claim 1 including a filler plug between said end portion and said blade supporting means and intermediate said tracks.

3. A blade assembly for use on a power driven cutting machine, comprising a blade holder designed for operable connection to said machine for rotation about a central axis, said blade holder including an end portion and a blade supporting portion parallel to and spaced from said end portion and integral therewith by means of a U-shaped end to form a stop disposed transversely of said blade holder, a blade comprising a rigid body having two oppositely disposed edges defining tracks, said blade releasably frictionally mounted on said blade holder by engagement of said tracks with respective opposite sides of said blade supporting portion, one end of said tracks engageable with said stop under centrifugal force during rotation of said blade holder, and cutting elements projecting from said body.

4. A blade assembly for use on a power driven cutting machine, comprising a blade holder designed for operable connection to said machine for rotation about a central axis, said blade holder including a closed U-shaped end portion defining a blade supporting clip member, a blade comprising a rigid body having two oppositely disposed edges defining tracks and including a cutting member projecting from said body, and said blade releasably frictionally mounted on said blade holder by engagement of said tracks with respective opposite sides of said clip member.

5. A device as defined in claim 3 including a filler plug between said end portion and said blade supporting portion and intermediate the tracks on said blade.

6. A blade assembly for use on a power driven cutting machine, comprising a blade holder designed for operable connection to said machine for rotation about a central axis, said blade holder including an end portion and a blade supporting portion parallel to and spaced from said end portion and integral therewith by means of a U-shaped end to form a stop disposed transversely of said blade holder, a blade comprising a rigid body having two oppositely disposed edges defining tracks, said blade releasably frictionally mounted on said blade holder by engagement of said tracks with respective opposite sides of said blade supporting portion and with said track edges being intermediate said end portion and said blade supporting portion, one end of said tracks engageable with said stop under centrifugal force during rotation of said blade holder, and cutting elements projecting from said body.

7. A blade assembly for use on a power driven cutting machine, comprising an elongated blade holder designed for operable connection to said machine for rotation about a central axis, a U-shaped end portion of said holder having an integral blade supporting clip in parallel spaced relationship thereto and disposed transversely of the longitudinal axis of said holder, and a blade comprising a rigid body defining clip engaging tracks on two opposite edges and including cutting elements projecting from said body, and said blade releasably, frictionally mounted on said blade holder by engagement of said tracks with respective opposite sides of said clip.

8. A blade assembly for use on a power driven cutting machine, comprising, an elongated blade holder designed for operable connection to said machine for rotation about a central axis, an end portion of said holder having an integral member in parallel spaced relationship to form a blade supporting means, and a blade consisting of a rigid body with track means thereon for slidable engagment with said blade supporting means and including a cutting element projecting therefrom.

References Cited in the file of this patent
UNITED STATES PATENTS

| | | |
|---|---|---|
| 754,008 | Parsons | Mar. 8, 1904 |
| 1,954,579 | Smith | Apr. 10, 1934 |
| 2,232,261 | Orr | Feb. 18, 1941 |
| 2,477,442 | Cramer et al. | July 26, 1949 |
| 2,592,755 | Soenksen | Apr. 15, 1952 |
| 2,649,678 | Sishc | Aug. 25, 1953 |
| 2,651,159 | Rountree | Sept. 8, 1953 |
| 2,706,441 | Caldwell et al. | Apr. 19, 1955 |
| 2,740,249 | Stearns | Apr. 3, 1956 |
| 2,859,582 | Babcock | Nov. 11, 1958 |